United States Patent
Lange et al.

(10) Patent No.: US 11,002,618 B2
(45) Date of Patent: *May 11, 2021

(54) SYSTEM AND METHODS FOR ASSESSING WHOLE-BUILDING THERMAL PERFORMANCE

(71) Applicant: Vermont Energy Investment Corporation, Burlington, VT (US)

(72) Inventors: Nicholas Cresswell Lange, Hyde Park, VT (US); Ethan Goldman, Burlington, VT (US); Gregory Josh Fanslow, Burlington, VT (US); Jacob Curtis Jurmain, South Burlington, VT (US)

(73) Assignee: Vermont Energy Investment Corporation, Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/680,635

(22) Filed: Nov. 12, 2019

(65) Prior Publication Data

US 2020/0080903 A1 Mar. 12, 2020

Related U.S. Application Data

(63) Continuation of application No. 15/636,689, filed on Jun. 29, 2017, now Pat. No. 10,473,534, which is a continuation of application No. 14/213,105, filed on Mar. 14, 2014, now Pat. No. 9,709,449.

(60) Provisional application No. 61/792,843, filed on Mar. 15, 2013.

(51) Int. Cl.
*G01K 17/20* (2006.01)

(52) U.S. Cl.
CPC .................................. *G01K 17/20* (2013.01)

(58) Field of Classification Search
CPC .......... G01K 17/20; G01K 13/00; F24F 11/30; F24F 11/47; F24F 11/52
See application file for complete search history.

(56) References Cited

U.S. PATENT DOCUMENTS

| 9,709,449 B2* | 7/2017 | Lange | G01K 17/20 |
| 9,939,333 B2* | 4/2018 | Steinberg | F24F 11/30 |
| 10,473,534 B2* | 11/2019 | Lange | G01K 17/20 |
| 2015/0276495 A1* | 10/2015 | Smullin | F24F 11/00 702/130 |

* cited by examiner

*Primary Examiner* — Bryan Bui
(74) *Attorney, Agent, or Firm* — Shawn Gordon, Esq.; Dunkiel Saunders Elliott Raubvogel & Hand, PLLC

(57) ABSTRACT

An assessment system and method are described that capture indoor temperature measurements and corresponding outdoor temperature measurements in order to determine a thermal efficiency of a structure. The assessment system identifies quiescent periods and trims these periods to eliminate undesirable influences such as auxiliary heating or solar gain. The quiescent periods are then compared to outdoor temperature differences to determine the thermal efficiency of the structure. The system can model the structure's performance metrics, through inferred qualitative and quantitative characterizations including, but not limited to, the building's rate of temperature change as a function of internal and external temperatures, the building's heating, cooling, and other energy needs as they relate to the building envelope, appliances, and other products used at the site and occupant behavior.

17 Claims, 7 Drawing Sheets

SYSTEM AND METHODS FOR ASSESSING WHOLE-BUILDING THERMAL PERFORMANCE

RELATED APPLICATION DATA

This application is a continuation of U.S. application Ser. No. 15/636,689 filed Jun. 29, 2017 and titled "System and Methods for Assessing Whole-Building Performance", which is a continuation of U.S. application Ser. No. 14/213,105 filed Mar. 14, 2014 and titled "System and Methods for Assessing Whole-Building Performance" (now patented as U.S. Pat. No. 9,709,449) and claims the benefit of priority of U.S. Provisional Patent Application No. 61/792,843 filed Mar. 15, 2013, and titled "System and Method for Assessing Whole-Building Thermal Performance", both of which are incorporated by reference.

FIELD OF THE INVENTION

The present invention generally relates to systems and methods for evaluating the energy efficiency and/or thermal characteristics of structures. In particular, the present invention is directed to Systems and Methods for Assessing Whole Building Thermal Performance.

BACKGROUND

Methods for evaluation of the energy performance of structures, e.g., office buildings, homes, apartments, etc., are of significant importance because, without an understanding of a structure's performance, it is challenging to determine whether improvements will lead to significant benefits to the structure's owner or occupants.

Understanding a structure's thermal efficiency well after commissioning and in older structures is also challenging because the building materials deteriorate over time. For example, insulation and seals around windows of a building may deteriorate over time due to exposure to harsh conditions such as ultraviolet rays from the sun and other harsh weather conditions like rain, wind, snow, and ice. Aging and the aforementioned conditions cause the building materials to lose their effectiveness as insulators and barriers against moisture and air and thereby contribute to decreased energy efficiency of a building. However, determining how these factors affect the structure's thermal efficiency, in a cost-effective manner has proved elusive.

Methods and systems have been developed to evaluate the energy performance or thermal efficiency of structures, but these methods and systems require complicated, high technology systems; intense data intake and controls; and/or particular conditions in order to obtain adequate measurements. Because of these aforementioned characteristics, these systems are practically useless for existing structure owners and the contractors they may hire to understand/improve their structure's efficiency. Accordingly, there is a need in the art for a system and method which can provide useful baseline energy metrics from which a building occupant can compare their building against without the need for specialized equipment, extensive data collection, and/or non-standard conditions to conduct the data acquisition.

SUMMARY OF THE DISCLOSURE

In a first exemplary aspect a system for characterizing a thermal efficiency of a structure comprises: a measurement device for recording an inside temperature of the structure; a first database including periodic outside temperature measurements proximate the structure; a second database in communication with the measurement device and the first database, the second database configured to receive, as inputs, the inside temperature and the outside temperature and to correlate the inside temperature and the outside temperature; and a processor in communication with the second database and capable of executing a set of instructions, the set of instructions including: determining a difference between the inside temperature and the outside temperature; determining a plurality of quiescent periods from the inside temperature; determining a rate of change during each of the plurality of quiescent periods; comparing the rate of change with the difference; and determining a thermal efficiency of the structure from the comparing.

In another exemplary aspect, a context-based thermal efficiency determination system for a structure comprises: a data acquisition device capable of recording or receiving a raw data set including an inside temperature, a set-point, a heating data, an outside temperature, a weather metric, and an occupancy metric; and an analysis module determining, based upon the raw data set, a plurality of quiescent periods, wherein the plurality of quiescent periods includes a plurality of divergent quiescent periods and a plurality of non-divergent quiescent periods; a thermal efficiency module determining a thermal efficiency of the structure based upon the plurality of non-divergent quiescent periods.

A method of characterizing a thermal efficiency of a structure comprising: collecting temperature data from inside the structure and outside the structure; determining a difference between the temperature inside the structure and outside the structure; determining, from the inside temperature data, a plurality of quiescent periods; determining a rate of change during each of the plurality of quiescent periods; relating the rate of change to the corresponding differences in temperature inside the structure and outside the structure; and determining, from the relating, a thermal efficiency of the structure.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A system and method of assessing whole-building thermal performance of the present disclosure collects indoor temperature measurements and the time associated with those measurements and isolates quiescent period(s) for analysis of rate of change in temperature inside the structure (i.e., heating or cooling) in conjunction with the difference between the indoor and external temperatures and provides a measurement of building efficiency. The system can model the building's performance metric(s), through inferred qualitative and quantitative characterizations including, but not limited to, the building's rate of temperature change as a function of internal and external temperatures, the building's heating, cooling, and other energy needs as they relate to the building envelope, appliances, and other products used at the site and occupant behavior. The system can also adjust the performance metric(s) using time-stamped hourly or sub-hourly interval electric consumption measurements such as could be obtained by electric utility "smart meters" or a comparable device as an indication of internal thermal gains in the building. The system can also correlate the performance metrics with, for example, the thermal characteristics of the building shell, so as to estimate heat losses through comparison and analysis to energy performance data, calibrate for useful energy consumption, identify building shell savings opportunities, identify usage behavior savings, identify equipment performance upgrade opportunities, and verify savings from energy efficiency improvements.

Figure 1:
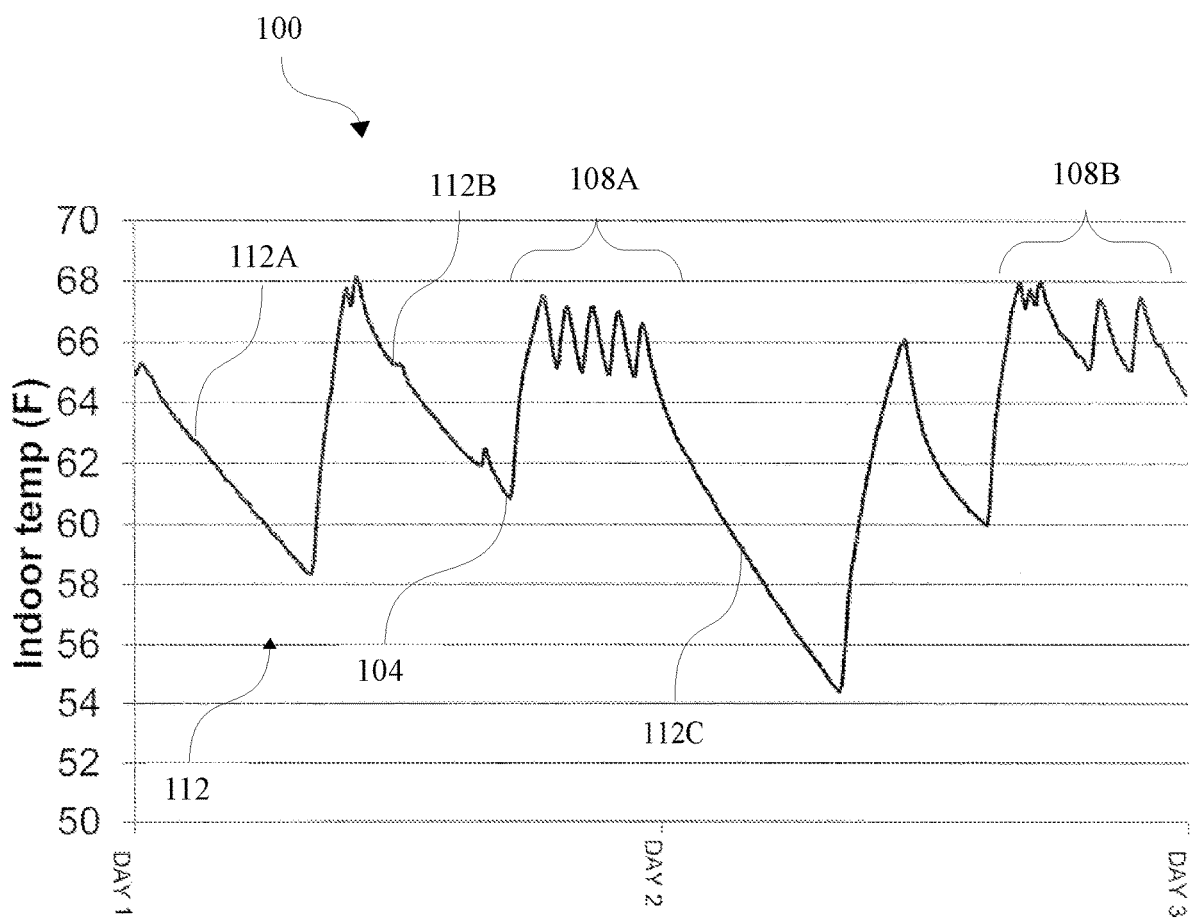
FIG. 1 is a graph of indoor temperature versus time.

Turning now to the figures, FIG. 1 shows a graph 100 that plots the inside temperature measurements 104 of a structure over several days. The inside temperature changes occurring within a structure are caused by a number of factors, including, but not limited to, heating or cooling units, occupancy, heat emitting devices (e.g., lights, electronics, ovens, etc.), solar heating, weather events, etc. As shown in FIG. 1, the structure experiences low temperature readings of about 58° F. and 54° F. degrees during the period of measurement and high temperature measurements of about 68° F. degrees. The structure also experiences a number of relatively rapid alternating changes in temperature, designated as regions 108A and 108B, as well as periods of relatively constant decline, e.g., quiescent periods 112A-C. Quiescent periods 112A-C represent periods of relative inactivity within the structure and are indicative of the thermal efficiency of the structure when evaluated with additional information as discussed in more detail below.

Figure 2:
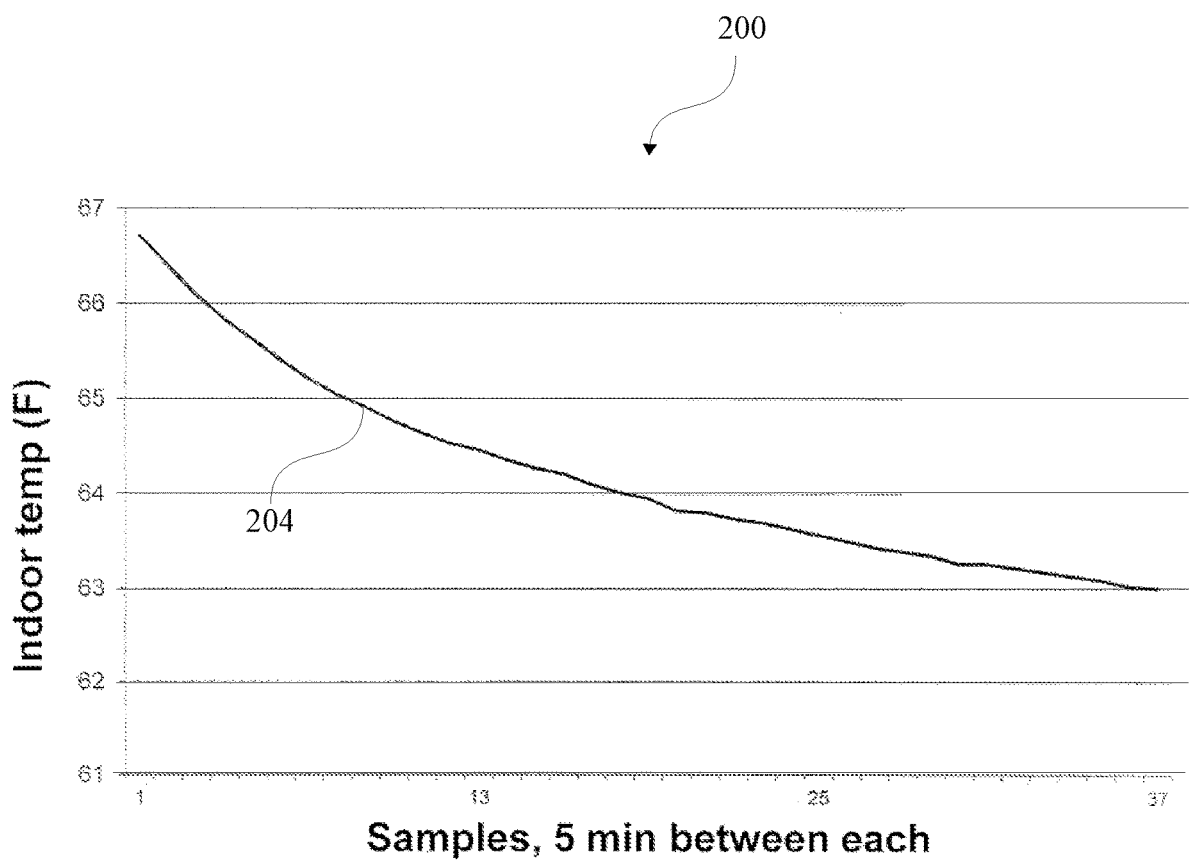
FIG. 2 is another graph of indoor temperature versus time.

FIG. 2 is a graph 200 of temperature over time, with the temperature measurements being taken at 5-minute intervals (represented by a cooling line 204) during a gradual cooling period, such as, for example, quiescent region 112A (FIG. 1). As shown, cooling line 204 gradually decreases from about 67° F. to about 63° F. over a span of about 3 hours. Cooling line 204, although not decreasing at a constant rate, is representative of the heat losses in the structure over this time frame.

Figure 3:
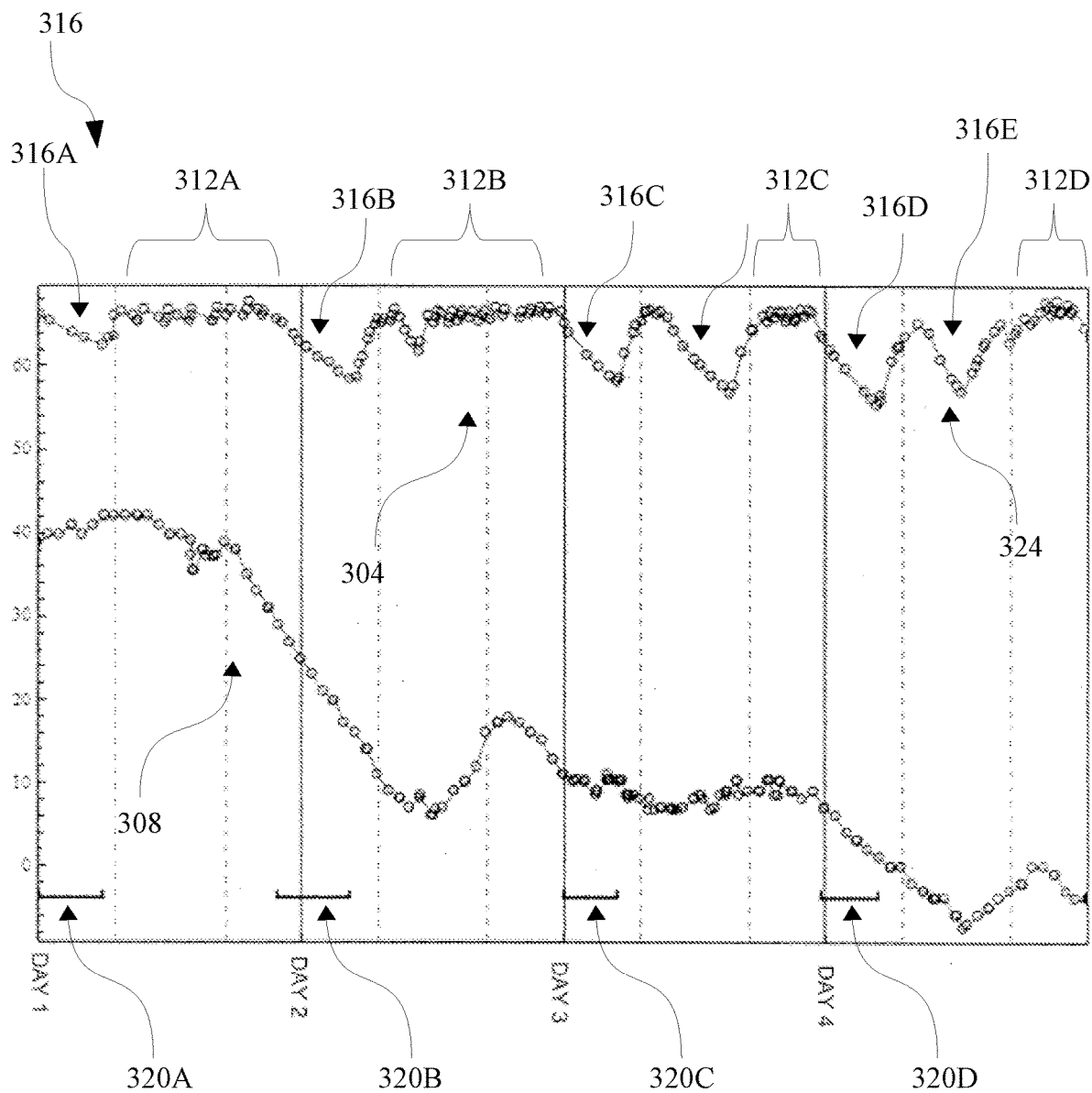
FIG. 3 is a graph of indoor temperature and a corresponding outdoor temperature versus time.

The rate of decrease of cooling line 204 is influenced by several factors, but primarily the temperature outside the structure. FIG. 3 is a graph 300 showing temperature measurements inside the structure, represented by inside temperature line 304, the temperature measurements outside the structure, represented by outside temperature line 308, over time. Inside temperature line 304 has some similarities to that of inside temperature measurements 104 (FIG. 1) in that it includes regions of relatively rapid alternating changes in temperature, regions 312A-D, and quiescent periods 316A-E. Regions 312A-D can represent periods where heating/cooling systems are attempting to maintain a constant temperature within the structure in response to requests by occupants of the structure. Thus, the heating/cooling system cycles on and off to provide, in this example, heat to the inside of the structure in response to heat losses by the structure. When the occupants of the structure are away or chose to have lower inside temperatures, the structure's heating/cooling system does not turn on for extended periods and during these periods there can be relatively constant heat losses (or gains depending on the external temperatures), i.e., quiescent periods 316A-E. Quiescent periods 316, when correlated with other data, can provide a performance metric related to the structure's thermal efficiency. However, and as explained in more detail below, not all quiescent periods 316 should be used to evaluate the thermal efficiency of a structure. Certain quiescent periods 316, referred to herein as divergent quiescent periods, should be excluded due to influences that impact that rate of temperature change, e.g., weather events, poor data availability, occupancy changes, etc. As shown in FIG. 3, non-divergent quiescent periods 320A-D (corresponding to quiescent periods 316A-D) are quiescent periods without significant thermal influences, whereas an identified divergent quiescent period 324 (corresponding to quiescent period 316E) has such influences (note the shallower slope of quiescent period 316D when compared to 316E despite continuous decreasing outside temperatures, which may be indicative of, for example, solar heat gain).

As evident from graph 300, the temperature outside the structure influences the temperature inside the structure. Thus, as the outside temperature drops, the rate of decrease of quiescent regions 316 increases. For example, it is apparent that quiescent region 316A occurring at an outside temperature of about 40° F. decreases at a slower rate (shallower slope) than quiescent region 316D occurring at an outside temperature of between 10° F. and 0° F.

Figure 4:
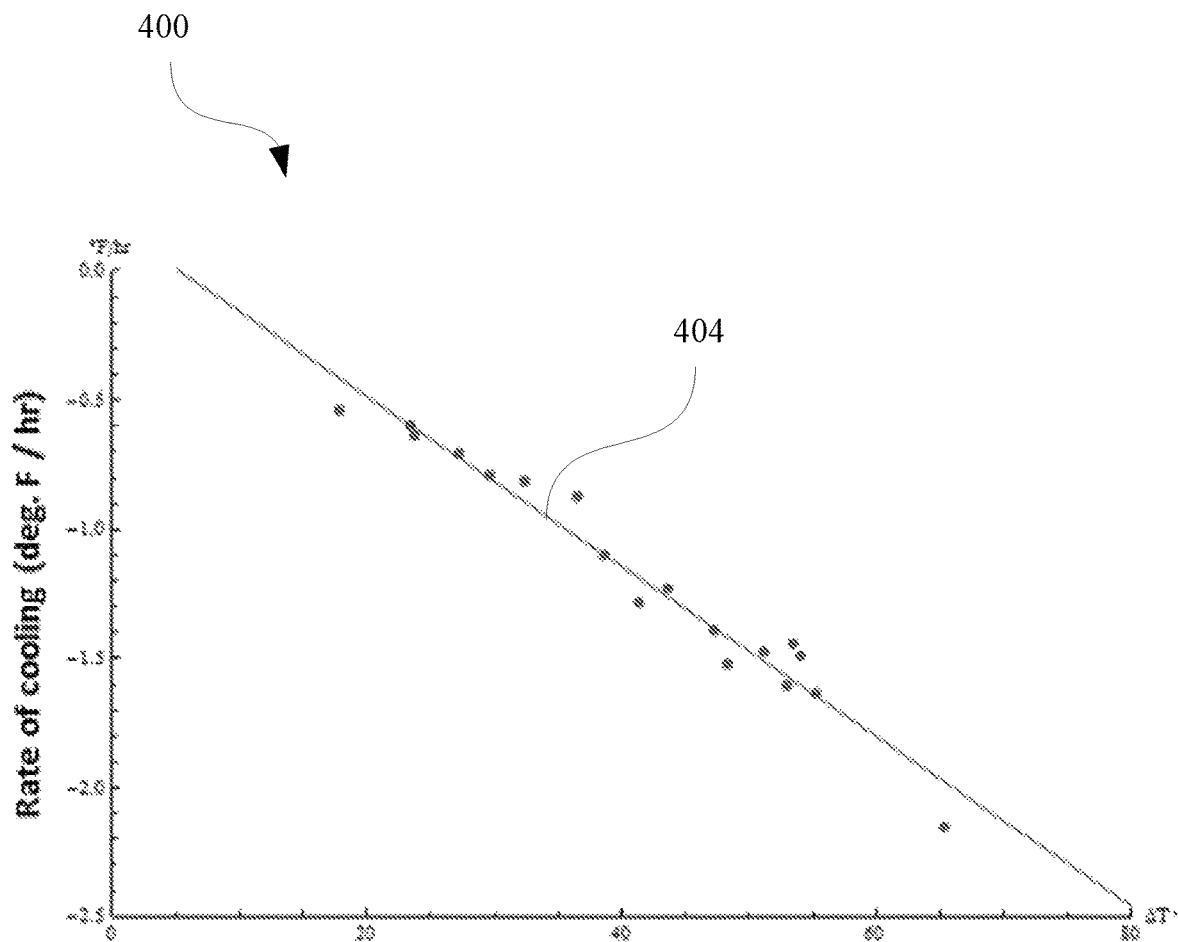
FIG. 4 is a graph of the rate of temperature change versus the difference between the indoor temperature and outdoor temperature according to an embodiment of the present invention.

FIG. 4 is a graph 400 of the rate of change of the temperature (° F./hr) versus the difference between the inside temperature of the structure and the outside temperature of the structure ($\Delta T$). The relationship between the rate of change of each quiescent region 316 and the differences between the inside and outside temperature provides insight into the thermal efficiency of structure and is discussed in more detail below. As shown in FIG. 4, trend line 404 indicates the aforementioned relationship that forms a part of the system and method of the present disclosure.

Figure 5:
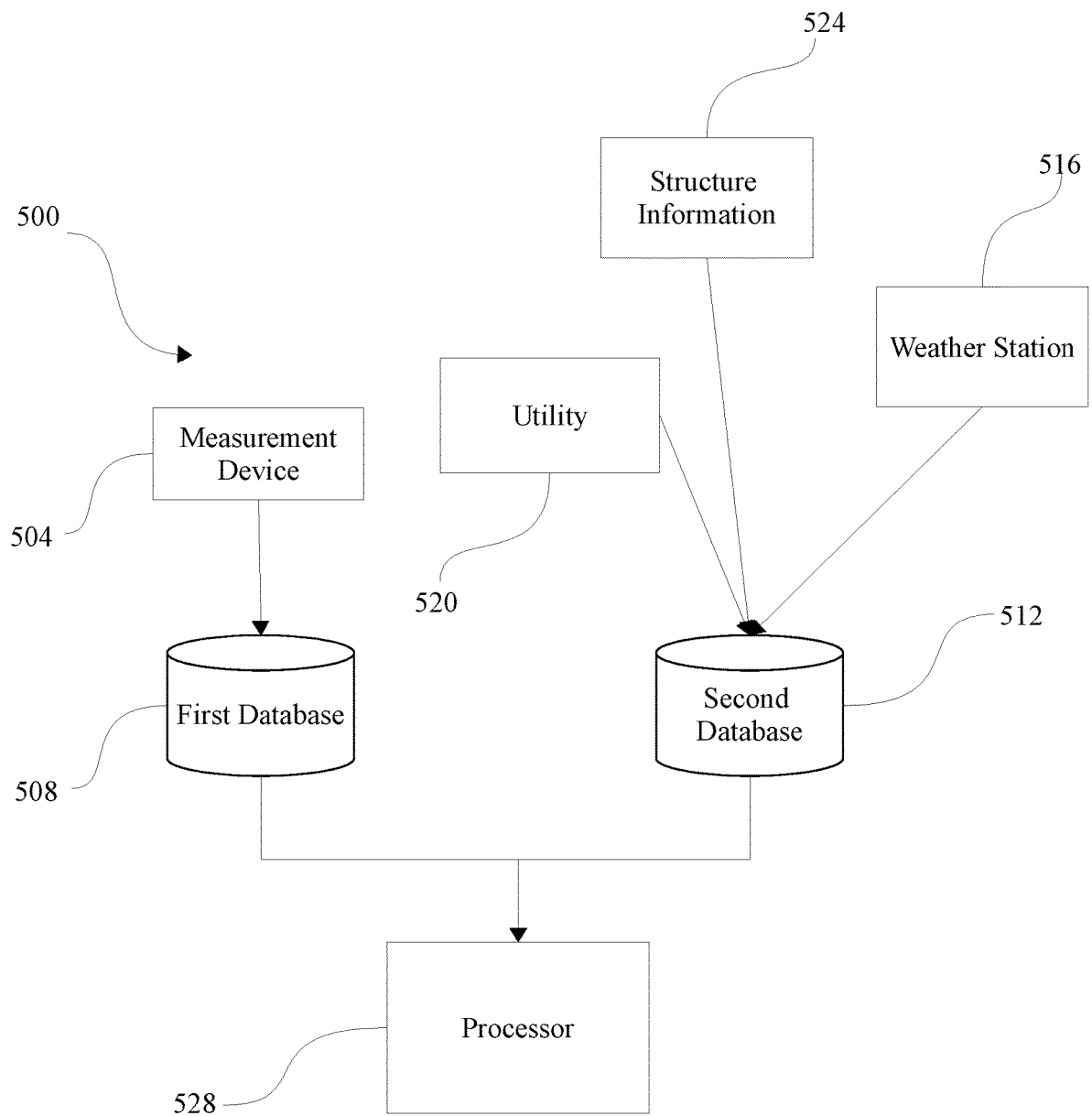
FIG. 5 is a block diagram of an assessment system according to an embodiment of the present invention.

Turning now to a discussion of the components of a system for assessing structure thermal performance (hereinafter, "assessment system") according to the present disclosure and with reference to FIG. 5, there is shown an exemplary assessment system 500. Assessment system 500 includes, at a high level a measurement device 504, a first database 508, a database 512, and a processor 528.

At a high level, measurement device 504 monitors and reports the inside temperature of the structure and also provides a time-stamp associated with the measurement. In an exemplary embodiment, measurement device 504 is a "smart" thermostat, capable of sending collected data related to the temperature of the structure as well as any defined temperature set-points, and receiving data inputs, although no special conditions (e.g., controls, steady-state conditions, etc.) are required in order to receive data of sufficient quality for inclusion in assessment system 500. Also, although the system can accommodate rapid/continuous monitoring by measurement device 504, there is not a need for intensive monitoring of temperature inside the structure. For example, in an exemplary embodiment, measurement device 504 records a temperature measurement in about 5-minute intervals. In another exemplary embodiment, measurement device 504 records temperature measurement at variable lengths intervals. In this embodiment, the variable length intervals can range from 4 to 60 minutes in length.

In an alternative embodiment, measurement device 504 is a temperature sensor such as, but not limited to, a thermocouple, a thermistor, a resistance thermometer and a silicon band gap temperature sensor, that transmits a signal representative of the temperature of the inside of the structure to, for example, first database 508, which applies the time-stamp when the signal is received. Measurement device 504 can be a wired or wireless device and can be configured to monitor, record, store, or transmit data, including, but not limited to, temperature data, humidity, HVAC system status, and occupancy. In another exemplary embodiment, more than one measurement device 504 is employed within assessment system 500. In other exemplary embodiments, measurement device 504 can collect additional inputs, such as, but not limited to, a temperature set-point, a building characteristic such as heating system information, an electrical information, and a demographic information associated with the building. Assessment system 500 can include a plurality of measurement devices 504 (not shown), or a single measurement device capable of sensing multiple types of data.

First database 508 receives and stores data received from measurement device 504. As discussed above, in certain embodiments, first database 508 may include additional information upon receipt of data from measurement device 504. For example, first database 508 may apply a time-stamp indicating the time of receipt of the data from measurement device 504. As another example, first database may include information such as, which measurement device 504 (in the case that multiple devices are employed with assessment system 500) provided the data. First database 508 stores the data in a format and organization compatible with future uses of the data contained therein.

Second database 512 is configured to receive and store data from third-parties, such as, but not limited to, weather station data (e.g., wind, temperature, sun movements, etc.) 516, utility data 520, and structure information 524, or other measurement devices external to the structure. As with first database 508, second database 512 may include additional information upon receipt of data from the third-parties. For example, second database 512 may apply a time-stamp indicating the time of receipt of the data from third-parties. While first database 508 and second database 512 are described separately, the two databases could be combined into a single database or be a part of a data acquisition device configured to perform the functions of the databases as described herein.

Data stored in first database 508 and second database 512 is evaluated using instructions included within processor 528. The instructions included within processor 516 perform analyses on the data received from first database 508 and second database 512 in order to generate a thermal efficiency value for the structure. In an exemplary embodiment, processor 528 determines the differences between the inside temperature measurements and the outside temperature measurements of the structure. In this embodiment, the inside temperature measurements are recorded by measurement device 504, as discussed above, and the outside temperature measurements are provided by a third-party source, such as weather station 516. The difference between the two measurements are time-based, with the understanding that the time of collection of the inside temperature may deviate from the time of collection by the third-party and the deviation being reconciled by processor 528 using methods described herein.

Processor 528 also determines the quiescent periods, such as quiescent periods 316A-E, that occurred within the structure from the inside temperature measurements. Generally, quiescent periods are those periods in which the inside temperature shows a relatively constant decrease (or increase depending on the temperature outside the structure) over a period of time. In an exemplary embodiment, the period of time sufficient for determining a quiescent periods is about 4 hours, but could be as short as about 2 hours. After identifying one or more quiescent periods, processor 528 determines the rate of change during each of the quiescent periods identified and then compares the rate of change with the difference in temperature between the inside and outside of the structure during the time-period of the rate of change. From this comparison, a thermal efficiency of the structure is deduced by generating a linear regression of the quiescent periods with the average indoor-outdoor temperature difference being used as predictor of the heat loss rate of the structure (as shown in FIG. 4). The slope of the linear regression is a measure of the thermal efficiency of the structure, i.e., a more thermally efficient structure will have a shallower slope than a less thermally efficient structure, assuming similar surface area-to-volume ratios of the structure.

Processor 528 may also be capable of identifying and filtering out auxiliary heating and other events, by recognizing the occurrence of such events occurring with the structure. For example, if during a quiescent period, the inside temperature of the structure rises or falls outside of the thermostatic set-point dead-band, this can be used as an indicator of space heating or cooling provided by secondary (or non-thermostat controlled) sources like a wood stove or a room air conditioner. These quiescent periods can then be removed from the analysis to provide a more accurate assessment of building thermal efficiency. Similarly, processor 528 can filter out events such as solar gains, window and door heat losses, fans, occupant activities, and thermal mass effects using similar methods as described just above. For example, heating or cooling is often represented in the data by smooth, continuous curves and thermal mass effects are discernible when the slope of the temperature change during the quiescent period deviates from an established normal rate. As another example, information in second database 512, such as utility data, can be used to filter out particular quiescent periods that show internal thermal gains due to electric energy use or other measurable factors.

Assessment system 500 is also adaptable to multi-zone dwellings/structures. For example, by using data, such as, but not limited to, square footage, occupancy, and other information as indicated above, unified building performance metrics can be obtained. In one embodiment, the collected data is weighted, integrated, and combined with trend data from each zone of the multi-zone structure to produce one or more performance metrics.

Alternative embodiments of system 500 can provide the ability to:
  1. Recognize and characterize variances in site metrics to serve as indicators of changed energy usage, and/or efficiency at the site.
  2. Allow for Customer engagement through display (on device, mobile app, website, e-mail, or direct mail) of site-specific insights derived through the above and the following:
      a. QA/QC (also Evaluation, Measurement and Verification) of thermal efficiency-related work and changes (contractor or DIY).

b. Homeowner usage behavior assessment to support energy savings estimates and guarantees, calibration of energy consumption estimates and benchmarking.
c. Duty-cycle of steady state heating (system sizing, short cycling losses, over-sizing, underperformance, and other faults and inadequacies in heating systems).
d. Estimating energy impacts (potential or actual) of controls, behavioral, and system changes.
e. Estimating improvement in building envelope performance in completed weatherization projects.

Figure 6:
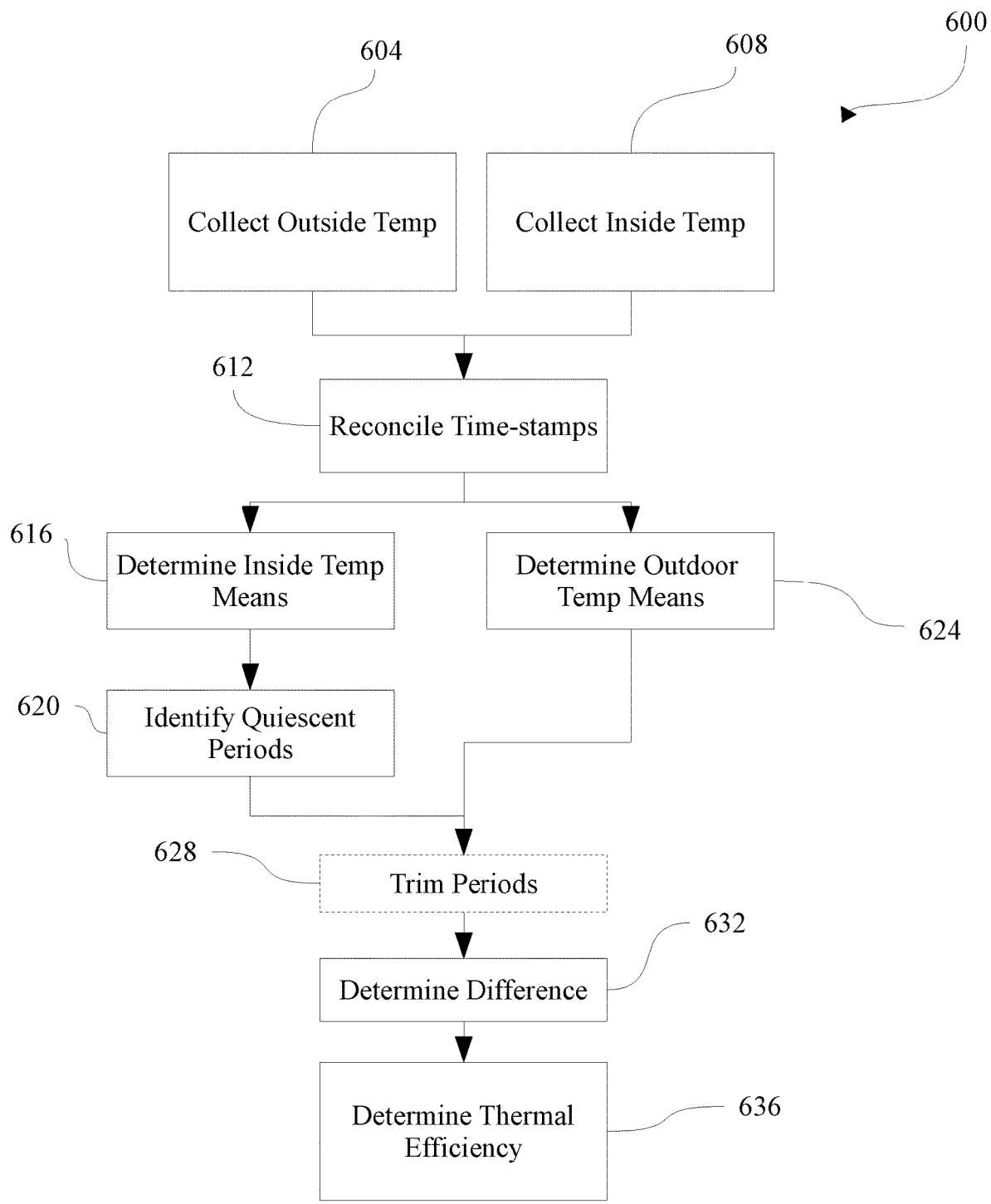
FIG. 6 is a block diagram of an exemplary method of determining the thermal efficiency of a structure according to an embodiment of the present invention.

Turning now to an exemplary method 600 of determining the thermal efficiency of a structure, with reference to FIGS. 1-5 and with further reference to FIG. 6, at step 608 a set of data points representative of a temperature inside the structure is collected. In an exemplary embodiment the data points include a timestamp indicative of the time the temperature was taken.

At step 604, outdoor temperature data is collected, the outdoor temperature data being data that is at least proximate the structure, e.g., similar area, town, zipcode. In an exemplary embodiment, outdoor temperature data is collected from a nearby National Weather Service (NWS) station, preferably in classes I, II, or III.

At step 612, the outdoor temperature measured closest to the same time as the indoor measurement is determined. In an exemplary embodiment, a linear interpolation of the outdoor temperature data is performed in order to ascertain the outdoor temperature at the same time as the indoor temperature measurement time. In another embodiment, the temporally closest outdoor temperature value to that of the indoor temperature measurement time is determined.

At step 616, the mean rate of indoor temperature change (i.e., the speed of heat loss or gain) between consecutive indoor temperature measurements is determined. In an exemplary embodiment, the mean rate is determined by creating a model of the mean rate of the indoor temperature change as a linear interpolation, i.e., as a series of lines between consecutive points. The average of the slopes of the series of lines is the mean rate.

At step 620, quiescent periods are identified. In an exemplary embodiment, quiescent periods are identified as those periods of continuous heat loss (or gain), e.g., consecutive sequences of negative (or positive) slopes determined in step 616.

At step 624, the mean outdoor temperature during the same period as the quiescent period determined in 620 used in step 616 is determined. In an exemplary embodiment, the mean outside temperature during each segment is the average of the outdoor temperature measurements associated with the start and end of the segments identified in step 616.

At step 628 certain segments (determined in step 616) of the quiescent periods are trimmed or filtered out. Exemplary trimming can include: assuming that segments which occur between dawn and dusk are biased by solar gain and therefore their slopes are unreliable estimators of the thermal envelope; discarding segments in the first hour of any quiescent period as these often contain anomalous behavior, possibly due to residual and transient behaviors of the ambient air in response to the change in operating conditions; and/or discarding the final segment of each quiescent period as these segments often contain the time at which the heating (or cooling) system reactivates and begins to warm (cool) the air, and so even if on average negative (positive)-sloped, that slope may be rendered smaller in magnitude than expected because of heating (cooling) by the heating (cooling) system. In an exemplary embodiment, any quiescent periods having two or fewer segments are removed, then with each quiescent period that survives, the first hour of the quiescent period and last segment of every quiescent period is trimmed off the quiescent period.

At step 632 the differences between the indoor and outdoor temperatures during each quiescent periods (at the quiescent period midpoint) is determined.

At step 636 a thermal efficiency of the structure is determined by generating a linear regression of the quiescent periods with the mean differences between indoor and outdoor temperature (as determined at step 628) being used as predictor of the heat loss rate of the structure. The slope of the linear regression is a measure of the thermal efficiency of the structure, i.e., a more thermally efficient structure will have a shallower slope than a less thermally efficient structure, assuming similar surface area-to-volume ratios of the structure. Notably, the y-intercept of the regression (the outdoor temperature at which heat loss rate is 0) represents the balance temperature. A lower balance temperature indicates a structure which either is better-performing or has more internal heating.

Figure 7:
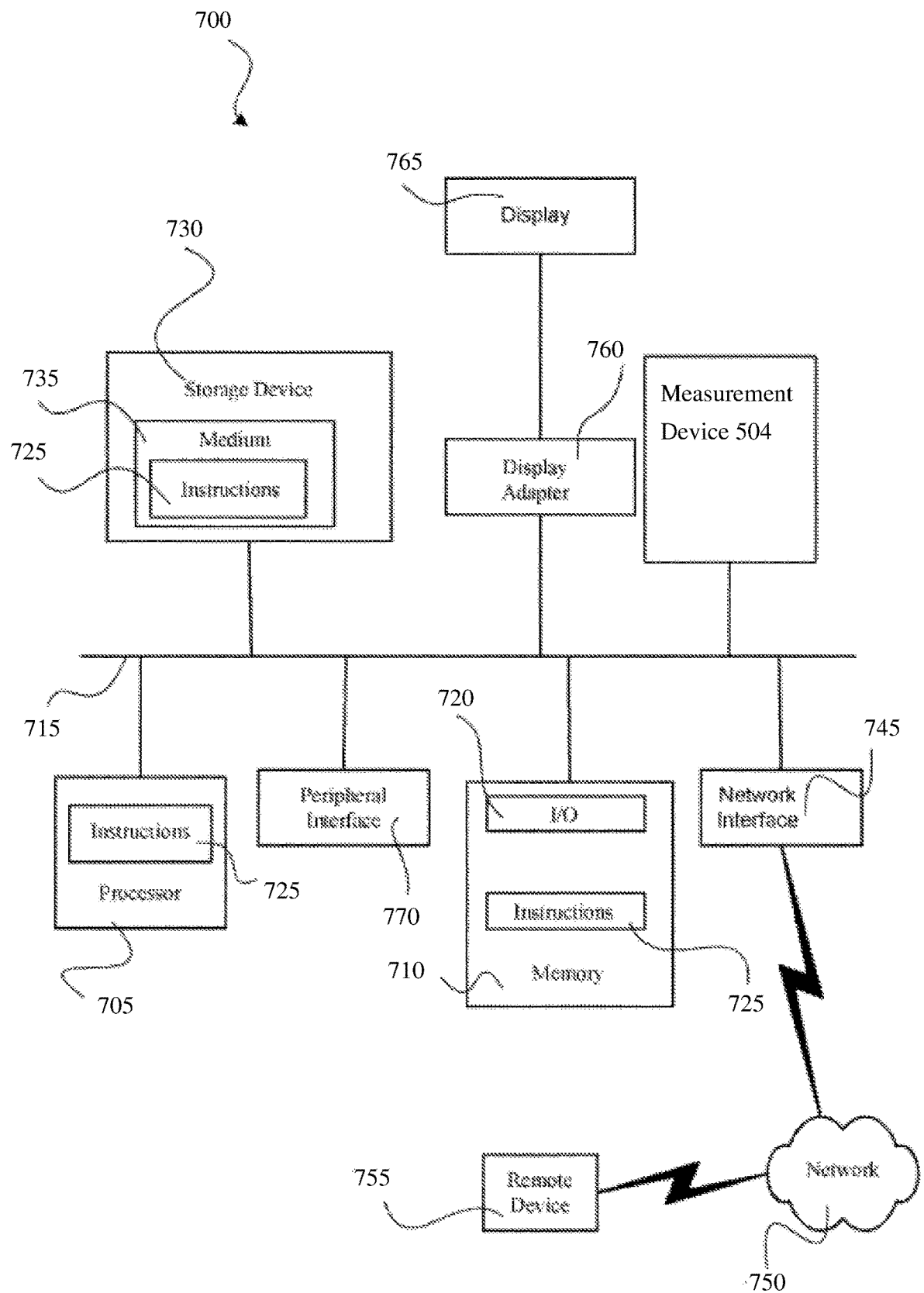
FIG. 7 is a block diagram of a computing environment that may be used to implement an assessment system according to an embodiment of the present invention.

FIG. 7 shows a diagrammatic representation of one implementation of a machine/computing device 700 that can be used to implement a set of instructions to perform any one or more of the aspects and/or methodologies of the present disclosure. Device 700 includes a processor 705 and a memory 710 that communicate with each other, and with other components, such as measurement device 504, via a bus 715. Bus 715 may include any of several types of communication structures including, but not limited to, a memory bus, a memory controller, a peripheral bus, a local bus, and any combinations thereof, using any of a variety of architectures.

Memory 710 may include various components (e.g., machine-readable media) including, but not limited to, a random access memory component (e.g., a static RAM "SRAM", a dynamic RAM "DRAM", etc.), a read-only component, and any combinations thereof. In one example, a basic input/output system 720 (BIOS), including basic routines that help to transfer information between elements within device 700, such as during start-up, may be stored in memory 710. Memory 710 may also include (e.g., stored on one or more machine-readable media) instructions (e.g., software) 725 embodying any one or more of the aspects and/or methodologies of the present disclosure, such as the instructions carried out by processor 528 described above. In another example, memory 710 may further include any number of program modules including, but not limited to, an operating system, one or more application programs, other program modules, program data, and any combinations thereof.

Device 700 may also include a storage device 730. Examples of a storage device (e.g., storage device 730) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 730 may be connected to bus 715 by an appropriate interface (not shown). Example interfaces include, but are not limited to, SCSI, advanced technology attachment (ATA), serial ATA, universal serial bus (USB), IEEE 7395 (FIREWIRE), and any combinations thereof. In one example, storage device 730 may be removably interfaced with device 700 (e.g., via an external port connector (not shown)). Particularly, storage device 730 and an associated non-transitory machine-readable medium 735 may provide nonvolatile and/or volatile storage of machine-readable instructions, data structures, program modules, and/or other data for device 700. In one example, instructions 725 may reside, completely or partially, within non-transitory machine-readable medium 735. In another example, instructions 725 may reside, completely or partially, within processor 705.

Device 700 may also include a connection to one or more systems or modules included with assessment system 500. Any system or device may be interfaced to bus 715 via any of a variety of interfaces (not shown) including, but not limited to, a serial interface, a parallel interface, a game port, a USB interface, a FIREWIRE interface, a direct connection to bus 715, and any combinations thereof. Alternatively, in one example, a user of device 700 may enter commands and/or other information into device 700 via an input device (not shown). Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof.

A user may also input commands and/or other information to device 700 via storage device 730 (e.g., a removable disk drive, a flash drive, etc.) and/or a network interface device 745. A network interface device, such as network interface device 745, may be utilized for connecting device 700 to one or more of a variety of networks, such as network 750, and one or more remote devices 755 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a direct connection between two computing devices, and any combinations thereof. A network, such as network 750, may employ a wired and/or a wireless mode of communication. In general, any network topology may be used. Information (e.g., data, instructions 725, etc.) may be communicated to and/or from device 700 via network interface device 755.

Device 700 may further include a video display adapter 760 for communicating a displayable image to a display device 765. Examples of a display device 765 include, but are not limited to, a liquid crystal display (LCD), a cathode ray tube (CRT), a plasma display, and any combinations thereof.

In addition to display device 765, device 700 may include a connection to one or more other peripheral output devices including, but not limited to, an audio speaker, a printer, and any combinations thereof. Peripheral output devices may be connected to bus 715 via a peripheral interface 770. Examples of a peripheral interface include, but are not limited to, a serial port, a USB connection, a FIREWIRE connection, a parallel connection, a wireless connection, and any combinations thereof.

A digitizer (not shown) and an accompanying pen/stylus, if needed, may be included in order to digitally capture freehand input. A pen digitizer may be separately configured or coextensive with a display area of display device 765. Accordingly, a digitizer may be integrated with display device 765, or may exist as a separate device overlaying or otherwise appended to display device 765.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for characterizing a thermal efficiency of a structure based upon an inside temperature of the structure, as provided by a measurement device and as stored within a first database, and periodic outside temperature measurements proximate the structure recorded in a second database, the system comprising:
    a processor in communication with the first database and the second database and capable of executing a set of instructions, the set of instructions including:
    correlating the inside temperature and the periodic outside temperature measurements,
    determining a difference between the inside temperature and the outside temperature;
    determining a plurality of quiescent periods from the inside temperature;
    determining a rate of change during each of the plurality of quiescent periods;
    comparing the rate of change with the difference; and
    determining a thermal efficiency of the structure from the comparing,
    wherein the processor includes a filtering module and certain ones of the plurality of quiescent periods are eliminated using the filtering module, and wherein the processor determines a typical quiescent period for a given difference and the filtering module correlates the difference with the given difference so as to eliminate certain ones of the plurality of quiescent periods that deviate from the typical quiescent period at the given difference.

2. A system according to claim 1, wherein the periodic outside temperature measurements are weather data from a third-party source.

3. A system according to claim 1, further including a sensor proximate the structure, the sensor configured to transmit a signal representative of a temperature external to the structure, and wherein the periodic outside temperature measurements are received from the sensor.

4. A system according to claim 1, wherein the processor includes a filtering module and certain ones of the plurality of quiescent periods are eliminated using the filtering module.

5. A system according to claim 4, wherein the processor determines a typical quiescent period for a given difference and the filtering module correlates the difference with the given difference so as to eliminate certain ones of the plurality of quiescent periods that deviate from the typical quiescent period at the given difference.

6. A system according to claim 4, wherein the filtering module identifies heating or cooling cycles and eliminates certain ones of the plurality of quiescent periods including the heating or cooling cycles.

7. A system according to claim 4, wherein the filtering module identifies auxiliary heating occurring within the structure and eliminates certain ones of the plurality of quiescent periods including auxiliary heating.

8. A system according to claim 1, wherein the measurement device records the inside temperature at predefined time periods, and wherein the predefined time periods are greater than about 5 minutes.

9. A system according to claim 1, wherein the measurement device records the inside temperature at variable time periods and wherein the variable time periods are greater than about 4 minutes.

10. A thermal efficiency analysis device comprising:
a temperature measurement device including a first thermal sensor positionable inside a structure and capable of sending a signal representative of an inside temperature and a second thermal sensor positionable outside of a structure and capable of sending a signal representative of an outside temperature,
a first database configured to receive and store, as inputs, the inside temperature signal;
a second database configured to receive and store, as inputs, the outside temperature signal; and
a processor in communication with the first database and the second database and capable of executing a set of instructions, the set of instructions including:
correlating the inside temperature signal and the outside temperature signal;
generating a plurality of quiescent periods based upon the inside temperature signals and the outside temperature signals;
comparing a rate of change of the quiescent periods with a difference between the inside temperature signals and outside signals; and
determining a thermal efficiency of the structure from the comparing.

11. A thermal efficiency analysis device according to claim 10, wherein the processor includes a filtering module and certain ones of the plurality of quiescent periods are eliminated using the filtering module, and wherein the processor determines a typical quiescent period for a given difference and the filtering module correlates the difference with the given difference so as to eliminate certain ones of the plurality of quiescent periods that deviate from the typical quiescent period at the given difference.

12. A thermal efficiency analysis device according to claim 10, further including a filtering module, wherein the filtering module identifies heating or cooling cycles and eliminates certain ones of the plurality of quiescent periods including the heating or cooling cycles.

13. A thermal efficiency analysis device according to claim 10, further including a filtering module, wherein the filtering module identifies auxiliary heating occurring within the structure and eliminates certain ones of the plurality of quiescent periods including the heating or cooling cycles.

14. A thermal efficiency analysis device according to claim 10, wherein the first thermal sensor determines the inside temperature at predefined time periods, and wherein the predefined time periods are greater than about 5 minutes.

15. A thermal efficiency analysis device according to claim 10, wherein the first thermal sensor records the inside temperature at variable time periods and wherein the variable time periods are greater than about 4 minutes.

16. A thermal efficiency analysis device according to claim 10, wherein the processor includes a filtering module and certain ones of the plurality of quiescent periods are eliminated using the filtering module.

17. A thermal efficiency analysis device according to claim 10, wherein the processor determines a typical quiescent period for a given difference and the filtering module correlates the difference with the given difference so as to eliminate certain ones of the plurality of quiescent periods that deviate from the typical quiescent period at the given difference.

* * * * *